United States Patent [19]

Iwami

[11] Patent Number: 5,159,671
[45] Date of Patent: Oct. 27, 1992

[54] DATA TRANSFER UNIT FOR SMALL COMPUTER SYSTEM WITH SIMULTANEOUS TRANSFER TO TWO MEMORIES AND ERROR DETECTION AND REWRITE TO SUBSTITUTE ADDRESS

[75] Inventor: Hiroyuki Iwami, Yokohama, Japan

[73] Assignee: Midori Electronics Co., Ltd., Kanagawa, Japan

[21] Appl. No.: 246,433

[22] Filed: Sep. 19, 1988

[30] Foreign Application Priority Data

Aug. 31, 1988 [JP] Japan ............................ 63-216491

[51] Int. Cl.⁵ ............................................ G06F 13/14
[52] U.S. Cl. .................................... 395/250; 395/425; 395/575; 364/242.3; 364/239; 364/268.5; 364/DIG. 1; 371/10.1
[58] Field of Search ............... 371/10, 10.1; 364/200 MS File, 900 MS File; 395/425, 575, 250

[56] References Cited

U.S. PATENT DOCUMENTS

| | | | |
|---|---|---|---|
| 4,479,179 | 10/1984 | Dinwiddie | 364/200 |
| 4,608,688 | 8/1986 | Hansen et al. | 371/10 |
| 4,864,291 | 9/1989 | Korpi | 364/200 |
| 4,864,532 | 9/1989 | Reeve et al. | 364/900 |

FOREIGN PATENT DOCUMENTS 59-38930  3/1984  Japan ............................ 371/10

*Primary Examiner*—Lawrence E. Anderson
*Attorney, Agent, or Firm*—Bachman & LaPointe

[57] ABSTRACT

A data transfer unit for a small computer system which has a host computer and main and auxiliary storage units, transfers data between the host computer, and the main and auxiliary storage units. The data transfer unit transfers the data, which is outputted from the host computer, from the data buffer to both the main and auxiliary storage units simultaneously, in an operation mode in which data is transferred from the host computer to the storage units. When an error occurs in the main or the auxiliary storage unit, the data transfer unit transfers the correct data from the other storage unit which is operating normally, to a substitute address in the storage unit in which the error has occured.

1 Claim, 3 Drawing Sheets

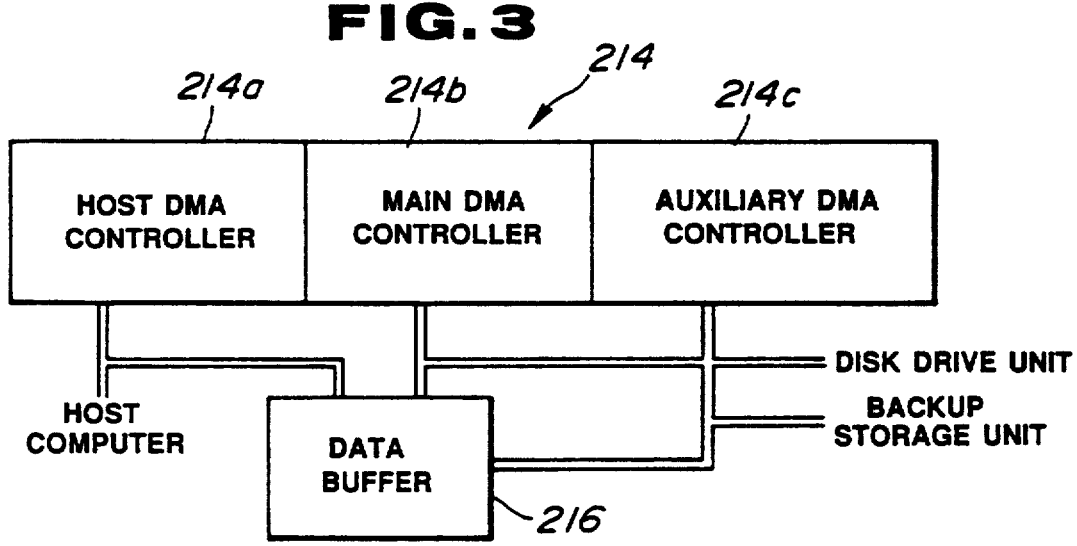
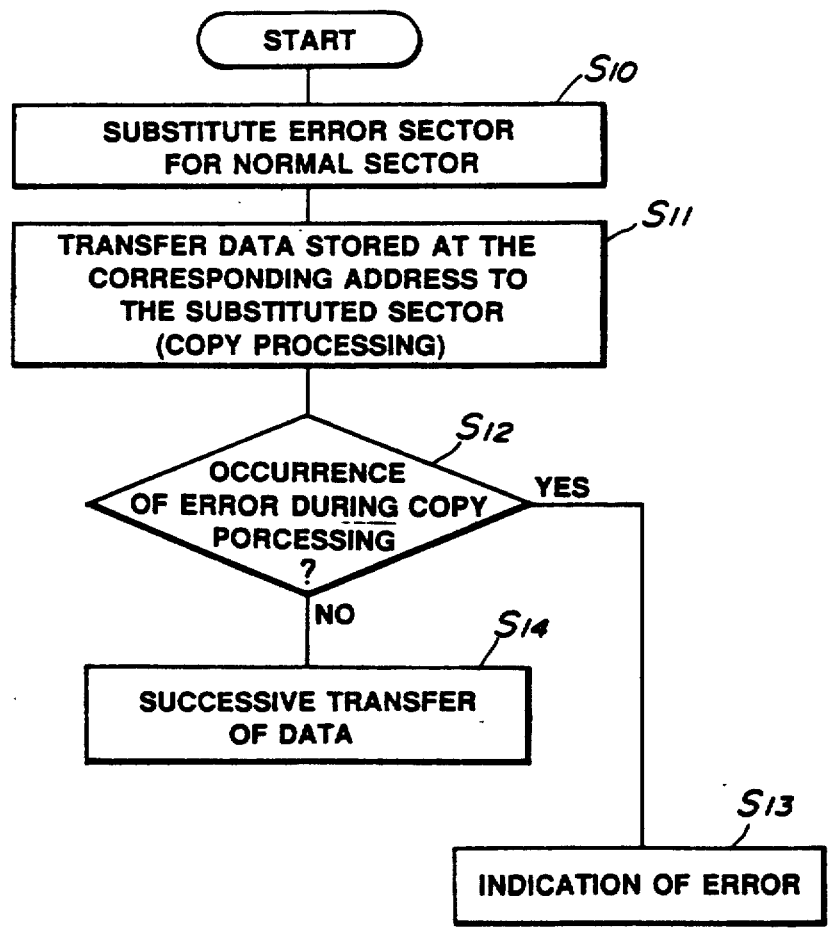

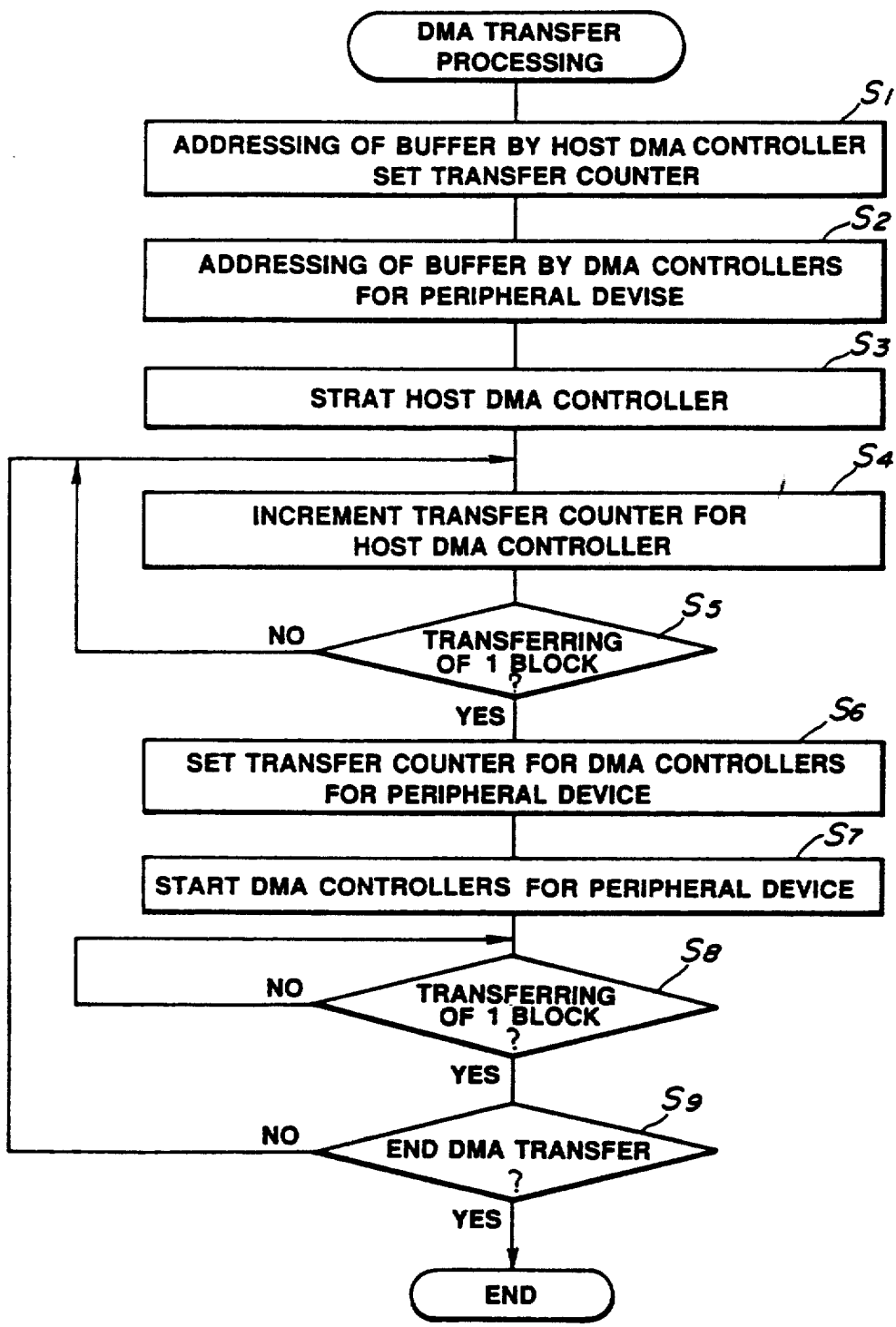

DATA TRANSFER UNIT FOR SMALL COMPUTER SYSTEM WITH SIMULTANEOUS TRANSFER TO TWO MEMORIES AND ERROR DETECTION AND REWRITE TO SUBSTITUTE ADDRESS

BACKGROUND OF THE INVENTION

1. Field of The Invention

The present invention relates generally to a data transfer unit for a small computer system, such as a personal computer or business computer. More specifically, the invention relates to a data transfer unit by which data can be stored in a main storage unit while backup data can be efficiently stored in an auxiliary storage unit.

2. Description of The Prior Art

As is well known, a personal computer, business computer or the like uses a main storage medium, such as a hard disk, for storing data, programs and so forth, and an auxiliary storage medium, such as a magnetic tape or floppy disk, for storing the data and so forth by as a precaution against an abnormality in the main storage unit. Generally, a very long time is required for the formation of backup data, since the data stored in the main storage unit are read out by means of a host computer, and then the data are transferred to the auxiliary storage unit via the host computer.

SUMMARY OF THE INVENTION

It is therefore an object of the present invention to overcome the aforementioned disadvantages and to provide a data transfer unit which can be used for effectively forming backup data.

It is another object of the invention to provide a data transfer unit which can transfer data even if an accident, such as write error, occurs in the storage unit when transferring data, and which assures that data is correctly stored in both main and auxiliary storage units by directly transferring data between the main and auxiliary storage units.

In order to accomplish the aforementioned and other specific objects, according to one aspect of the present invention, the data transfer unit for a small computer system which has a host computer and main and auxiliary peripheral devices, comprises:

data transfer means for transferring data between the host computer, and the main and auxiliary peripheral units;

a data buffer for temporarily storing data outputted from the host computer via the data transfer means, and for outputting the data to the main and auxiliary peripheral units via the data transfer means;

a direct memory access controller for controlling the data transfers between the data buffer and the host computer, between the data buffer and the main peripheral unit, and between the data buffer and the auxiliary peripheral unit; and control means for controlling the direct memory access controller;

the data transfer unit transferring the data, which is outputted from the host computer, from the data buffer to both the main and auxiliary peripheral units simultaneously, in an operation mode in which data is transferred from the host computer to the peripheral units.

The main and auxiliary peripheral units may be main and auxiliary storage units. The main storage unit may have a first storage medium for storing data which is used directly by the computer for data processing, and the auxiliary storage unit may have a second storage medium serving as a backup memory of the main storage unit.

According to another aspect of the invention, the data transfer unit for a small computer system which has a host computer and main and auxiliary storage units, comprises:

data transfer means for transferring data between the host computer, and the main and auxiliary storage units;

a data buffer for temporarily storing data outputted from the host computer via the data transfer means, and for outputting the data to the main and auxiliary storage units via the data transfer means;

a direct memory access controller for controlling the data transfers between the data buffer and the host computer, between the data buffer and the main storage unit, and between the data buffer and the auxiliary storage unit; and control means for controlling the direct memory access controller;

the data transfer unit transferring the data, which are outputted from the host computer, from the data buffer to both the main and auxiliary storage units simultaneously, in an operation mode in which data is transferred from the host computer to the storage units; and when an error occurs in one of the main and auxiliary storage units, the data transfer unit succesively transferring the data to store the latter in the other storage unit which is operating normally.

The transfer unit may detect the address of the error containing storage region in the storage unit in which the error occurs, assign another normal address as a substitute for the error address, and transfer data from the address in the other storage unit corresponding to the error address, to the substitute address.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to this sepcific embodiment, but are for explanation and understanding only.

In the drawings:

FIG. 3 is a schematic block diagram of a DMA controller of FIG. 2;

FIG. 4 is a flow chart of a control program for data transfer according to the present invention; and FIG. 5 is a flow chart of a program for error recovery according to the present invention.

DESCRIPTION OF THE PREFERRED EMBODIMENT

Figure 1:
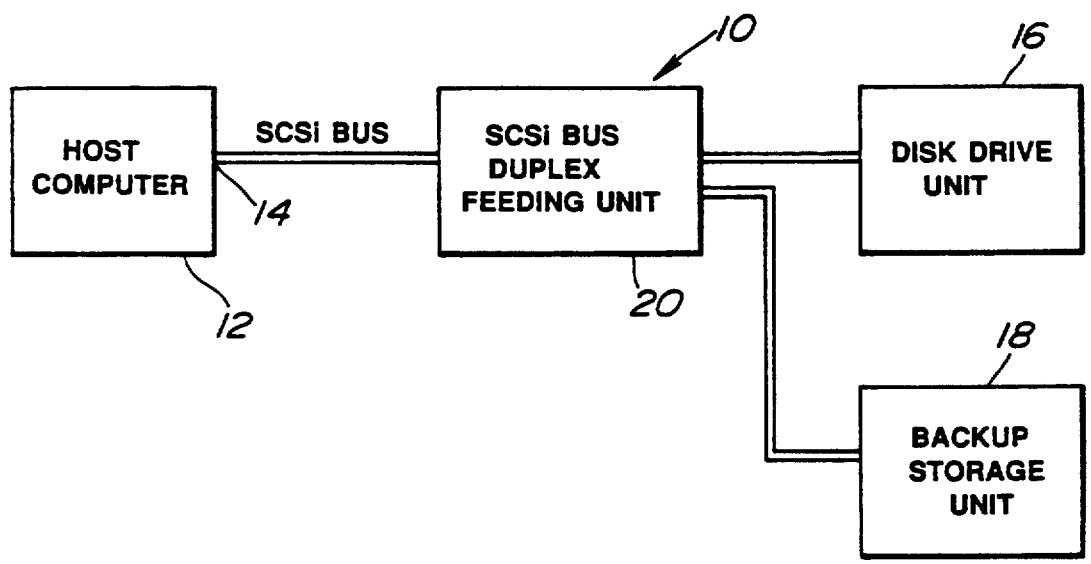
FIG. 1 is a schematic block diagram of the preferred embodiment of a data transfer unit for a small computer system according to the present invention.

Referring now to the drawings, particularly to FIG. 1, the small computer system includes a data transfer unit 10 and a host computer 12. The host computer 12 may be a small computer, such as a personal computer or business computer. The host computer 12 is provided with an interface having an input/output port 14. The host computer 12 is connected via the input/output port 14 to a disk drive unit 16, for example, a hard disk drive, floppy disk drive or the like, which serves as a main peripheral device, and a backup storage unit 18, for example, a data recorder or the like, which serves as an auxiliary peripheral device 14.

According to the preferred embodiment of the invention, a Small Computer System Interface (SCSi) bus is used for connecting the host computer 12 to the disk drive unit 16 and backup storage unit 18.

A SCSi bus duplex feeding unit 20 serving as the data transfer unit is provided between the input/output port 14 of the interface and the disk drive and backup storage units 16 and 18. The SCSi bus duplex feeding unit 20 controls data transfer in read and write modes between the host computer 12 and the disk drive and backup storage units 16 and 18.

The SCSi bus duplex feeding unit 20 can operate in any one of three operation modes. In a first operation mode, when a read or write error of data occurs in either main or auxiliary storage unit, a normal storage region is substituted for the error storage region in which he error has occured, and whereafter normal processing is performed. In a second operation mode, when some kind of irreparable damage occurs in the main or auxiliary storage unit, the storage unit in which the damage has occurred is disconnected from the system so that the normally operating storage unit only is used, after which normal processing is performed. In the latter case, an alarm, error message or the like indicating that damage has occured in the storage unit is generated. In a third operation mode, the SCSi bus duplex feeding unit 20 reads data stored in the disk drive unit 16 at a desired address, and simultaneously reads data in the backup storage unit 18 at the address corresponding to that of the disk drive unit 16, and then compares the data of the respective units and transfers the data to the host computer 12 while thus confirming the data.

In the third operation mode, when the data read out of the disk drive unit 16 is not same as that of the backup storage unit 18, either a read error is indicated and readout is stopped, or the data read out of the disk drive unit 16 together with the indication of read error are transferred to the host computer 12.

Figure 2:
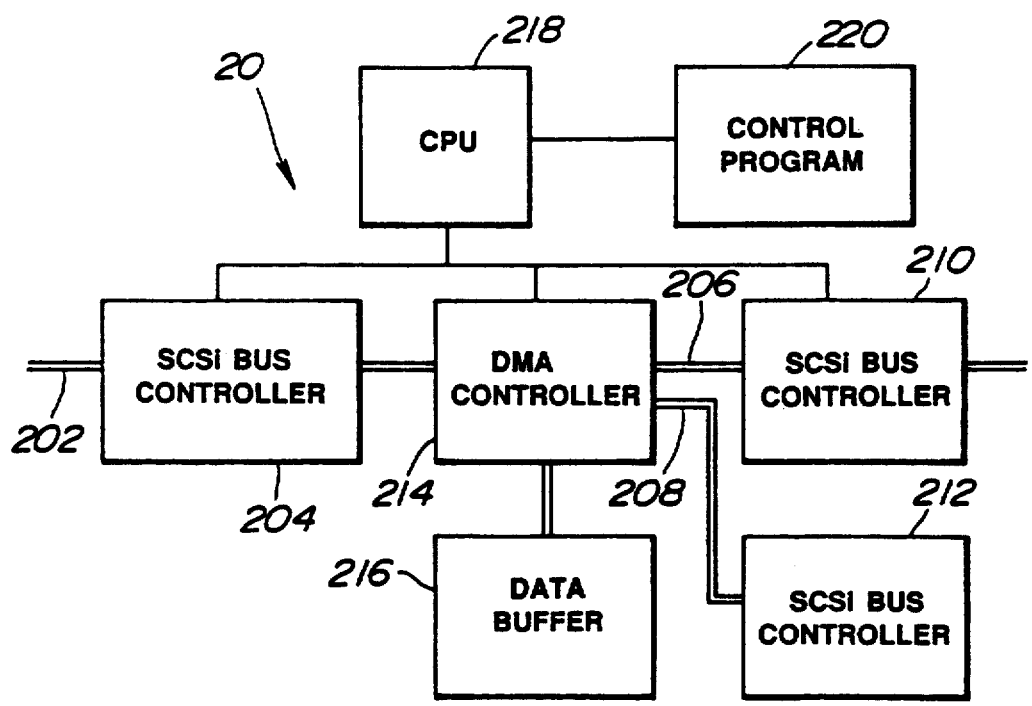
FIG. 2 is a schematic block diagram of a SCSi bus duplex feeding unit of the transfer unit of FIG. 1.

FIG. 2 is a block diagram of the SCSi bus duplex feeding unit 20. As shown in FIG. 2, the SCSi bus duplex feeding unit 20 comprises a SCSi bus controller 204 connected to the host computer 12 via a SCSi bus 202, a SCSi bus controller 210 connected to the disk drive unit 16 via a SCSi bus 206, and a SCSi bus controller 212 connected to the backup storage unit 18 via a SCSi bus 208. The SCSi bus controller 204 will be referred to as "host SCSi bus controller". The SCSi bus controllers 210 and 212 will be referred to as "main SCSi bus controller" and "auxiliary SCSi bus controller", respectively. A direct memory access (DMA) controller 214 is provided between the host SCSi bus controller 204 and the main and auxiliary SCSi bus controllers 210 and 212. The DMA controller 214 is connected to a data buffer 216 and is also connected a CPU 218 for controlling DMA operation. The CPU 218 is also connected to a program memory 220 storing a DMA operation control program therein. In addition, the CPU 218 is connected to an operation mode selecting switch not shown, by which an operation mode control program corresponding to the aforementioned first, second and third operation mode is read out of the program memory 220 to be executed so as to control the operation of the DMA controller 214. The operation mode selecting switch can select one of a single mode and double mode. When the single mode is selected, the data transfers between the disk drive unit 16 and host computer 12 and between the backup storage unit 18 and host computer 12 are perforemed independently of each other. On the other hand, the first and third operation modes can be selected in only the double mode.

FIG. 3 shows, the DMA controller 214 in detail. The DMA controller 214 comprises a host DMA controller 214a, a main DMA controller 214b and a auxiliary DMA controller 214c. The host DMA controller 214a is connected to the host SCSi bus controller 204 and controls the data transfer between the data buffer 216 and the host computer 12. The main DMA controller 214b controls the data transfer between the disk drive unit 16 and the data buffer 216. The auxiliary DMA controller 214c controls the data transfer between the backup storage unit 18 and the data buffer 216.

FIG. 4 is a flow chart showing the preferred embodiment of a data transfer operation, according to the present invention.

The program shown in FIG. 4 is executed in accordance with the data transfer command in the read and write modes. Since the relationship between the date transfer operations in the read and write mode is symmetrical, only the write mode will be described hereafter. Both the disk drive unit 16 and the backup storage unit 18 will be referred to as "peripheral device".

First, when a data transfer command in the write mode is inputted, the addressing of storage region in the data buffer 216 is performed by means of the host DMA controller 214a, and simultaneously a transfer counter not shown is set (Step 1). Next, the DMA controllers 214b and 214c connected to the peripheral devices are actuated to address a predetermined storage region in the data buffer 216 (Step 2).

In the Step 2, when the addressing by the DMA controllers 214b and 214c is completed, the host DMA controller 214a starts to actuate and temporarily stores data, which is outputted from the host computer 12, in the data buffer 216 (Step 3). A data transfer unit has 8 bits. Each time a unit of the data transfer is completed, the transfer counter is incremented (Step 4). The counter value of the transfer counter which is incremented at the Step 4 is compared with a block of data transfer counter number (Step 5). Until the counter value of the transfer counter reaches the predetermined counter number, the operations in the Steps 4 and 5 are repeated.

In the Step 5, when it is detected that the value of the transfer counter reaches the predetermined counter number, the operations of the DMA controllers 214b and 214c connected to the peripheral devices are started, and the transfer counter is set (Step 6). Then, the output data of the host computer 12, which is temporarily transferred to the data buffer 216 in 8-bit transfer units, are transferred to the peripheral devices. Each time a unit of data transfer is completed, the transfer counter is incremented (Step 7). Next, the counter value of the transfer counter is compared with a predetermined counter number corresponding to one transfer block (Step 8). Until the counter value of the transfer counter reaches the predetermined counter number, the operations of the Steps 7 and 8 are repeated.

In the Step 8, when it is detected that the counter value reaches the predetermined counter number, it is confirmed that the transferring of all data are completed (Step 9). When some data are not transferred, the operations of the Steps 4 and 9 are repeated. In the Step 9, when it is detected that the transferring of all data is completed, the processing is finished.

On the other hand, according to the preferred embodiment of the invention, when a write error occurs in the disk drive unit 16 or the backup storage unit 18, if the error recovery mode is set, a normal sector or cylinder is substituted for the error sector or cylinder in which the error has occured. FIG. 5 shows an error recovery program which is executed when the aforementioned error occurs. This program is executed using the detection of write error as an trigger. For convenience, an example wherein a write error occurs in the sector of the disk drive unit 16, the error recovery program is described below.

When a write error is detected, the error recovery program shown in FIG. 5 is triggered, and the main DMA controller 214b is actuated to address a normal sector in the disk drive unit substituted for the error sector in which the error has occured (Step 10). Next, the auxiliary DMA controller 214c connected to the normally operating backup storage unit 18 is actuated, so that the data of the backup storage unit 18 at the address corresponding to that of the disk drive unit 16 where the error has occured are read out to be transferred to the data buffer 216, which data is written on the newly addressed sector (Step 11). Then, it is checked again to determined whether or not any errors occur while copying data (Step 12). When it is determined that an error hasoccured, the error is indicated in Step 13 and the transfer processing is stopped. On the other hand, if no error occurs, the transfer processing is performed in Step 14.

In the aforementioned embodiment, although a process for recovering data is described in cases where a read error or write error occurs in the disk drive unit 16, similar results to the aforementioned case can be obtained in cases where an accident occurs in the backup store unit 18.

Furthermore, according to the aforementioned preferred embodiment, although the main storage unit and the auxiliary storage unit for backup are used as the peripheral units connected to the host computer, a peripheral unit, such as printer, display or the like can be substituted for these units. In addition, although the example in which data are simultaneously transferred to two peripheral units is described in the aforementioned preferred embodiment, a data transfer unit according to the present invention can be also used for the data transfers between the host computer and three or more peripheral units.

As described above, according to the present invention, since the data transfers between the host computer and two or more peripheral units can be simultaneously performed, data storage processing time can be decreased when backup data corresponding to the data stored in the main storage unit must be stored. Furthermore, since the data are simultaneously written in the main and auxiliary storage units according to the invention, it is possible to successively perform the data transfer processing even if an error occurs in one of storage units, and to automatically modify the data by transferring data to a normal sector or cylinder of the storage unit where an accident occurs, by means of another storage unit where data is normally written, during or after data transferring.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A data transfer unit for a computer system forming part of a data network utilizing an SCSi bus which has a host computer, a main storage unit and an auxiliary storage unit, said data transfer unit comprising:
   data transfer means for transferring data between the host computer and the main and auxiliary storage units;
   data buffer means for temporarily storing data outputted from the host computer via the data transfer means and for outputting the data to the main and auxiliary storage units via the data transfer means;
   a direct memory access controller for controlling the data transfers between the data buffer means and the host computer, between the data buffer means and the main storage unit, and between the data buffer means and the auxiliary storage unit;
   control means for controlling the direct memory access controller,
   whereby said data transfer unit transfers the data outputted from the host computer from the data buffer means to both the main and auxiliary storage units simultaneously in an operation mode during which data is transferred from the host computer to the storage units and successively transfers the data for storage in a first one of said storage units which is operating normally when an error occurs in a second one of said storage units; and
   said transfer unit detecting an address of an error containing storage region in the second one of said storage units in which said error occurs, assigning a normal address as a substitute address for the error address, and transferring data from an address in the other storage unit corresponding to the error address to the substitute address.

* * * * *